(12) United States Patent
Liu

(10) Patent No.: US 9,807,802 B2
(45) Date of Patent: Oct. 31, 2017

(54) METHOD AND DEVICE FOR ADJUSTING CONTENTION WINDOW VALUE ADAPTIVELY

(71) Applicant: XI'AN ZHONGXING NEW SOFTWARE CO. LTD., Xi'an (CN)

(72) Inventor: Xiangfeng Liu, Guangdong (CN)

(73) Assignee: XI'AN ZHONGXING NEW SOFTWARE CO. LTD. (CN)

( * ) Notice: Subject to any disclaimer, the term of this patent is extended or adjusted under 35 U.S.C. 154(b) by 191 days.

(21) Appl. No.: 14/426,286

(22) PCT Filed: Aug. 23, 2013

(86) PCT No.: PCT/CN2013/082181
§ 371 (c)(1),
(2) Date: Mar. 5, 2015

(87) PCT Pub. No.: WO2014/036896
PCT Pub. Date: Mar. 13, 2014

(65) Prior Publication Data
US 2015/0257174 A1 Sep. 10, 2015

(30) Foreign Application Priority Data
Sep. 5, 2012 (CN) .......................... 2012 1 0325365

(51) Int. Cl.
*H04W 74/08* (2009.01)
*H04W 24/08* (2009.01)
(Continued)

(52) U.S. Cl.
CPC ......... *H04W 74/085* (2013.01); *H04W 24/08* (2013.01); *H04W 28/044* (2013.01); *H04W 84/12* (2013.01)

(58) Field of Classification Search
None
See application file for complete search history.

(56) References Cited

U.S. PATENT DOCUMENTS

2002/0188750 A1* 12/2002 Li ...................... H04W 74/085
709/235
2005/0064817 A1* 3/2005 Ginzburg ............ H04W 74/085
455/41.2
(Continued)

FOREIGN PATENT DOCUMENTS

CN 101631063 1/2010
CN 102065517 5/2011
(Continued)

OTHER PUBLICATIONS

International Search Report for International Patent Application No. PCT/CN2013/082181, dated Dec. 5, 2013.
(Continued)

*Primary Examiner* — Peter Chau
(74) *Attorney, Agent, or Firm* — McAndrews, Held & Malloy, Ltd.

(57) ABSTRACT

A method and device for adjusting contention window value adaptively are disclosed. The method comprises the following steps: the number n of stations participated in a contention currently is measured; according to the number n of stations participated in the contention currently, a practical collision probability $P_c$ of a current contention window value $CW_{old}$ and optimal collision probability $P_{copt}$ under the maximum network throughput are acquired; when a data frame is sent successfully, an initial contention window value $CW_{init}$ is adjusted according to the practical collision probability $P_c$ and optimal collision, probability $P_{copt}$; when a data frame is sent unsuccessfully, a retransmission contention window value $CW_{new}$ adjusted according to said practical collision probability $P_c$. The above solution can better reflect network collision situation, adaptively adjust an initial contention window value and retransmission contention window value jointly.

14 Claims, 11 Drawing Sheets

(51) Int. Cl.
*H04W 28/04* (2009.01)
*H04W 84/12* (2009.01)

(56) References Cited

U.S. PATENT DOCUMENTS

| | | | |
|---|---|---|---|
| 2005/0070317 A1 | 3/2005 | Liu | |
| 2009/0303908 A1* | 12/2009 | Deb | H04W 28/18 370/310 |
| 2011/0044303 A1* | 2/2011 | Ji | H04W 74/085 370/338 |
| 2013/0051323 A1* | 2/2013 | Song | H04W 28/044 370/328 |

FOREIGN PATENT DOCUMENTS

| | | |
|---|---|---|
| CN | 102421151 | 4/2012 |
| CN | 102421151 A | 4/2012 |
| WO | 2005006661 A1 | 2/2005 |
| WO | 2005094190 | 10/2005 |

OTHER PUBLICATIONS

PCT/CN2013/082181, Written Opinion of the International Searching Authority, dated May 12, 2013.
English Translation—PCT/CN2013/082181, Written Opinion of the International Searching Authority, dated May 12, 2013.
Communication dated Aug. 13, 2015 with Supplementary European Search Report corresponding to European Application No. EP 13835072.3.

* cited by examiner

METHOD AND DEVICE FOR ADJUSTING CONTENTION WINDOW VALUE ADAPTIVELY

CROSS-REFERENCE TO RELATED APPLICATIONS/INCORPORATION BY REFERENCE

This application is a 371 of International Patent Application No, PCT/CN2013/082181, filed Aug. 23, 2013, entitled "CONTENTION WINDOW VALUE ADAPTIVE ADJUSTING METHOD AND EQUIPMENT", which claims priority to Chinese Patent Application No. 201210325365.2, filed Sep. 5, 2012, entitled "SELF-ADAPTIVE CONTENTION WINDOW VALUE ADJUSTMENT METHOD AND DEVICE". The above-identified applications are hereby incorporated herein by reference in their entirety.

TECHNICAL FIELD

The disclosure relates to the technical field of network communications, and in particular to a method and device for adjusting a contention window value adaptively.

BACKGROUND

An access protocol based on contention in 802.11 (being a wireless local area network standard initially formulated by IEEE) standard constitutes the basis of 802.11 media access control (referred to as MAC) protocol, and the standard specifies a distributed coordination function (referred to as DCF) for a contention phase for the media access control layer (MAC) of the WLAN. The DCF uses the technology of Carrier Sense Multiple Access with Collision Detection (referred to as CSMA/CA) to detect a media state by means of physical and virtual carrier sense functions, and each terminal may independently determine to access a channel and enter into a back-off process when the access is failed so as to reconnect the channel, thereby providing a more flexible wireless communication manner.

In the wireless communication field, each terminal may independently determine to enter into the channel and enter into the back-off process when the access is failed so as to reconnect the channel. However, only one shared channel exists in the wireless local network, and therefore, a station with services to be sent needs to perform channel contention; when stations participated in channel contention are sensed to be idle, duration of a distributed coordination inter frame space (DIFS) is delayed, and a random back-off duration is further waited, and if the channel is still idle at the moment, then the channel is accessed. The random back-off duration is also called a contention window (CW), and in order to reduce the collision probability; the size of an optimal contention window depends on the quantity of stations participating in channel contention in a channel at the same time slot. If the number of stations participated in the contention is less, then the collision probability is low, and now a smaller contention window may be used so as to reduce delay; and if the number of stations participated in the contention is much, then the collision probability is high, and now it is suitable to use a larger contention window so as to reduce collision and improve throughput of the whole network.

In a wireless local area network standard, a back-off method of binary index in a unit of time slot is usually used to acquire a contention window value, and CW is a random integer selected from equal distribution on the section [0, CW-1], and CW ∈ [$CW_{min}$, $CW_{max}$], and during retransmission for an ith time, CW(i)=min[$2^i \cdot CW_{min}$, $CW_{max}$], and min( ) represents taking a minimum value within brackets. The CW is reset to be $CW_{min}$ after being sent successfully every time. However, in the case of network congestion, if the CW is reset to be $CW_{min}$ after successful sending, it would easily cause collision and retransmission, and reduce network throughput; and in the case of network congestion being relieved, the transmission would be doubled and the number of network idle time slots would be increased, and unnecessary delay would be introduced and the network throughput would be reduced.

SUMMARY

The main object of the embodiments of the disclosure is to provide a method and device for adjusting a contention window value adaptively so as to reduce network delay and improve network throughput.

The embodiments of the disclosure propose a method for adjusting a contention window value adaptively, and the method comprises the following steps:

measuring the number n of stations participated in a contention currently;

acquiring, according to the number n of stations participated in a contention currently, the practical collision probability $P_c$ of the current contention window value $CW_{old}$ and optimal collision probability $P_{copt}$ under the maximum network throughput;

adjusting, when a data frame is transmitted successfully, initial contention window value $CW_{init}$ according to the practical collision probability $P_c$ and optimal collision probability $P_{copt}$; and adjusting, when a data frame is transmitted unsuccessfully, a retransmission contention window value $CW_{new}$ according to the practical collision probability $P_c$.

Preferably, acquiring, according to the number n of stations participated in the contention currently, the practical collision probability $P_c$ of the current contention window value $CW_{old}$ and optimal collision probability $P_{copt}$ under the maximum network throughput specifically comprises:

when the number of stations participated in the contention currently is n and current contention window value is $CW_{old}$, determining the practical collision probability $P_c=1-(1-\tau)^{n-1}[1+(n-1)\tau]$, where $\tau$ is a sending probability of a station when a time slot of a channel begins and the current contention window value is $CW_{old}$; and when the number of stations participated in the contention currently is n and network throughput is maximum, determining the optimal collision probability $P_{copt}=1-(1-\tau_{opt})^{n-1}[1+(n-1)\tau_{opt}]$, where $\tau_{opt}$ is a sending probability of a station when a time slot of a channel begins and network throughput is maximum.

Preferably, adjusting the initial contention window value $CW_{init}$ according to the practical collision probability $P_c$ and optimal collision probability $P_{copt}$ specifically comprises:

comparing the practical collision probability $P_c$ with a lower limit, which is $P_{cmax}=P_{copt}-D_L$, of a collision probability threshold value and an upper limit, which is $P_{cmin}=D_L$, of the collision probability threshold value, wherein $D_L$ is an interactive tolerance threshold;

when $P_c<_{cmin}$, determining a current network to be idle, and reducing the initial contention window value $CW_{init}=\min[CW_{old}-CW_{step1}, CW_{max}]$, where $CW_{step1}$ is a step length of a first initial contention window value;

when $P_c > P_{cmax}$, determining a current network to be congested, and increasing the initial contention window value $CW_{init} = \min[CW_{old} + CW_{step2}, CW_{max}]$, where $CW_{step2}$ is a step length of a second initial contention window value;

when $P_{cmin} \leq P_c \leq P_{cmax}$, determining a current network to be good, and maintaining the initial contention window value $CW_{init} = \min[CW_{old}, CW_{max}]$.

Preferably, determining a current network to be idle, and reducing the initial contention window value $CW_{init}$ when the $P_c < P_{cmin}$ specifically comprises:

when $P_c < P_{cmin}$, detecting whether the current contention window value $CW_{old}$ is less than a contention window threshold value $Thr(n)$;

if yes, determining the current contention window value $CW_{old}$ to be appropriate with respect to the current network, and the step length of the initial contention window value $CW_{step1} = 0$, and maintaining the initial contention window value $CW_{init} = \min[CW_{old}, CW_{max}]$;

if no, determining the current contention window value $CW_{old}$ to be too large with respect to the current network, and the step length of the initial contention window value $CW_{step1} > 0$, and reducing the initial contention window value $CW_{init} = \min[CW_{old} - CW_{step1}, CW_{max}]$.

Preferably, adjusting the retransmission contention window value $CW_{new}$ according to the practical collision probability $P_c$ specifically comprises:

acquiring a Packet Error rate (PER) from a media access control layer;

detecting whether the PER is much greater than the practical collision probability $P_c$;

if yes, determining that a reason for data frame transmission failure is caused by bad network environment, and maintaining the retransmission contention window value $CW_{new} = \min[CW_{old}, CW_{max}]$; and if no, then determining that the reason for data frame transmission failure is caused by collision, and increasing the retransmission contention window value $CW_{new} = \min[CW_{old} + CW_{step3}]$, where $CW_{step3}$ is a step length of the retransmission contention window value.

The disclosure further provides a device for adjusting a contention window value adaptively, and the device comprises:

a measurement component configured to measure the number of stations participated in a contention currently:

an acquisition component configured to, according to the number n of stations participated in the contention currently, acquire the practical collision probability $P_c$ of the current contention window value $CW_{old}$ and optimal collision probability $P_{copt}$ under the maximum network throughput;

a first adjustment component configured to, when a data frame is transmitted successfully, adjust an initial contention window value $CW_{init}$ according to the practical collision probability $P_c$ and optimal collision probability $P_{copt}$; and a second adjustment component configured to, when data frame is transmitted unsuccessfully, according to the practical collision probability $P_c$, adjust retransmission contention window value $CW_{new}$.

Preferably, the acquisition component specifically comprises:

a first acquisition unit configured to, when the number of stations participated in the contention currently is n and the current contention window value is $CW_{old}$, determine the practical collision probability $P_c = (1-(1+\tau)^{n-1}[1+(n-1)\tau]$, where $\tau$ is a sending probability of a station when a time slot of a channel begins and the current contention window value is $CW_{old}$; and a second acquisition unit configured to, when the number of stations is participated in current contention is n and network throughput is maximum, determine the optimal collision probability $P_{copt} = 1-(1-\tau_{opt})^{n-1}[1+(n-1)\tau_{opt}]$, where $\tau_{opt}$ is a sending probability of a station when a time slot of a channel begins and network throughput is maximum.

Preferably, the first adjustment component specifically comprises:

a first comparison unit configured to compare the practical collision probability $P_c$ with a lower limit, which is $P_{cmax} = P_{copt} - D_L$, of a collision probability threshold value and an upper limit, which is $P_{cmin} = P_{copt} + D_L$, of the collision probability threshold value upper limit, where $D_L$ is an interactive tolerance threshold;

a first adjustment unit configured to, when $P_c < P_{cmin}$, determine a current network to be idle, and reduce the initial contention window value $CW_{init} = \min[CW_{old} - CW_{step1}, CW_{max}]$, where $CW_{step1}$ is a step length of a first initial contention window value;

a second adjustment unit configured to, when $P_c > P_{cmax}$, determine a current network to be congested, and increase the initial contention window value $CW_{init} = \min[CW_{old} - CW_{step2}, CW_{max}]$, where $CW_{step2}$ is a step length of a second initial contention window value; and a third adjustment unit configured to, when $P_{cmin} \leq P_c \leq P_{cmax}$, determine a current network to be good, and maintain the initial contention window value $CW_{init} = \min[CW_{old}, CW_{max}]$.

Preferably, the first adjustment unit is specifically configured to when $P_c < P_{cmin}$, detect whether the current contention window value $CW_{old}$ is less than a contention window threshold value $Thr(n)$;

if yes, then determine the current contention window value $CW_{old}$ to be appropriate with respect to the current network, and the step length of the initial contention window value $CW_{step1} = 0$, and maintaining the initial contention window value $CW_{init} = \min[CW_{old}, CW_{max}]$.

if no, then determine the current contention window value $CW_{old}$ to be too large with respect to the current network, and the step length of the initial contention window value $CW_{step1} > 0$, and reduce the initial contention window is value $CW_{init} = \min[CW_{old} - CW_{step1}, CW_{max}]$.

Preferably, the second adjustment component specifically comprises:

a packet error rate acquisition unit configured to acquire a PER from a media access control layer;

a second comparison unit configured to detect whether the PER is much greater than the practical collision probability $P_c$;

a fourth adjustment unit configured to, when the PER is greater than $P_c$, determine that a reason for data frame transmission failure is caused by bad network environment, and maintain the retransmission contention window value $CW_{new} = \min[CW_{old}, CW_{max}]$; and a fifth adjustment unit configured to, when the PER is not much greater than $P_c$, then determine that a reason for data frame transmission failure is caused by collision, and increase the retransmission contention window value $CW_{new} = \min[CW_{old} + CW_{step3}, CW_{max}]$, where $CW_{step3}$ is a step length of the retransmission contention window value.

The embodiments of the disclosure can better reflect network collision situation, dynamically adjust initial contention window value associating with retransmission contention window value, thus making the contention window value finally approaching to optimal value, improve the network throughout, and reduce the delay.

Objectives and advantages related to the disclosure will be illustrated in the subsequent descriptions and appended drawings.

DESCRIPTION OF EMBODIMENTS

It should be understood that specific embodiments described here are only used for illustrating the disclosure and not intended to limit the disclosure.

Figure 1:
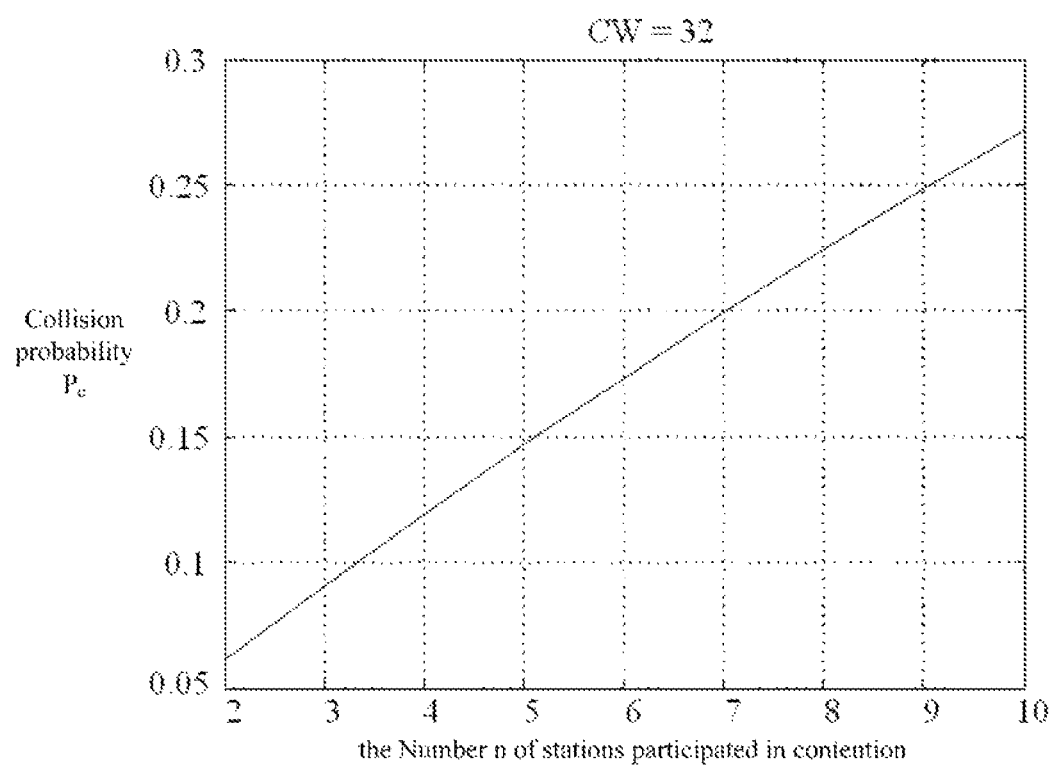
FIG. 1 is a diagram showing relationships between the number of contention stations and collision probability in a method for adjusting a contention window value adaptively according to the disclosure.

As shown in FIG. 1, FIG. 1 is a diagram showing relationships between the number of contention stations and collision probability in a method for adjusting a contention window value adaptively according to the disclosure.

The diagram showing relationships in FIG. 1 in the present embodiment is obtained by simulation according, to theoretical calculation in the case of CW being a certain value. In the case of CW being 32 assuming that the number of stations is n, and in the case of CW>16·n the collision probability is less than 0.05, and in the case of the CW being of other lengths, the relationship is also approximately satisfied.

Figure 2:
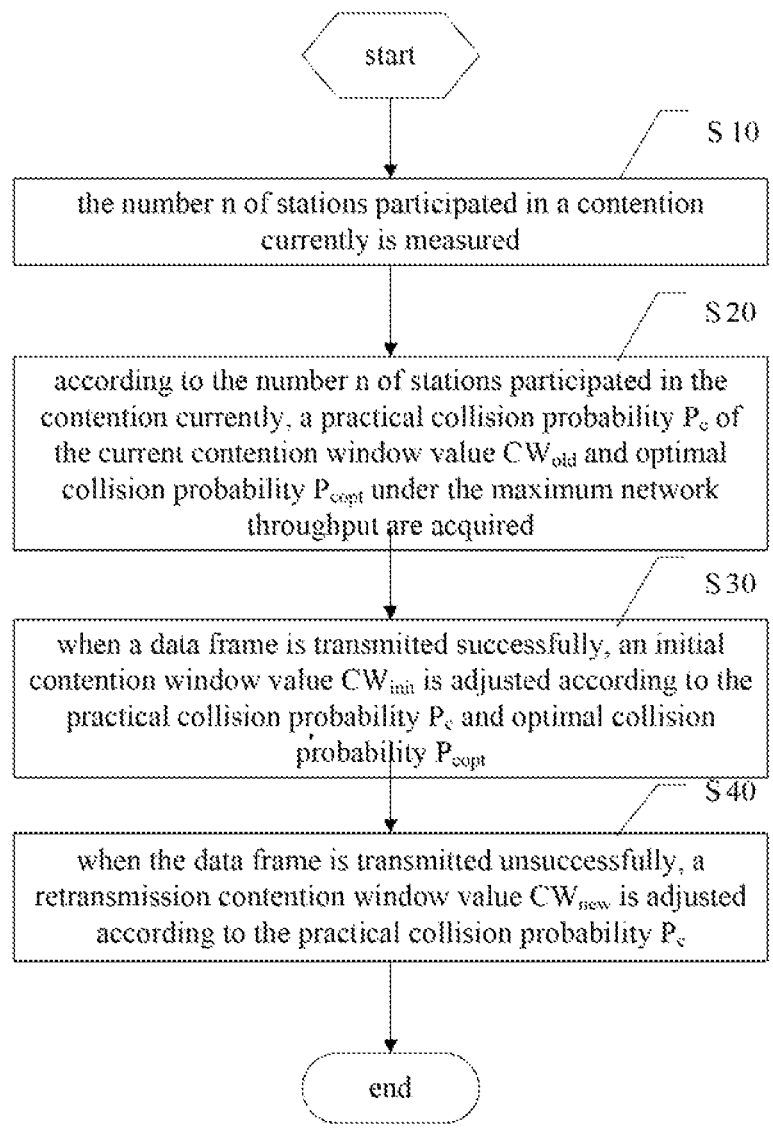
FIG. 2 is a flowchart of a method for adjusting a contention window value adaptively according to a first embodiment of the disclosure.

As shown in FIG. 2, FIG. 2 is a flowchart of a method for adjusting a contention window value adaptively according to a first embodiment of the disclosure. The method for adjusting a contention window value adaptively according to a first embodiment of the disclosure comprises the steps as follows:

step S10, the number n of stations participated in a contention currently is measured;

step S20, according to the number n of stations participated in the contention currently, a practical collision probability $P_c$ of the current contention window value $CW_{old}$ and optimal collision probability $P_{copt}$ under the maximum network throughput are acquired;

step S30, when a data frame is transmitted successfully, an initial contention window value $CW_{init}$ is adjusted according to the practical collision probability $P_c$ and optimal collision probability $P_{copt}$; and the practical collision probability and optimal collision probability are calculated according to the number of stations participated in the contention in the current network, and when the data frame is transmitted successfully, the practical collision probability is compared with the optimal collision probability under the maximum network throughput so as to dynamically adjust the initial contention window value.

Step S40, when the data frame is transmitted unsuccessfully, a retransmission contention window value $CW_{new}$ is adjusted according to the practical collision probability $P_c$.

When the data frame is transmitted unsuccessfully, the practical collision probability is compared with the packet error rate so as to dynamically adjust the retransmission contention window value.

The present embodiment may better reflect network collision situation, dynamically adjust the initial contention window value and retransmission contention window value jointly, which may make the contention window value is finally approaching to optimal value, improve the network throughout, and reduce the delay.

Figure 3:
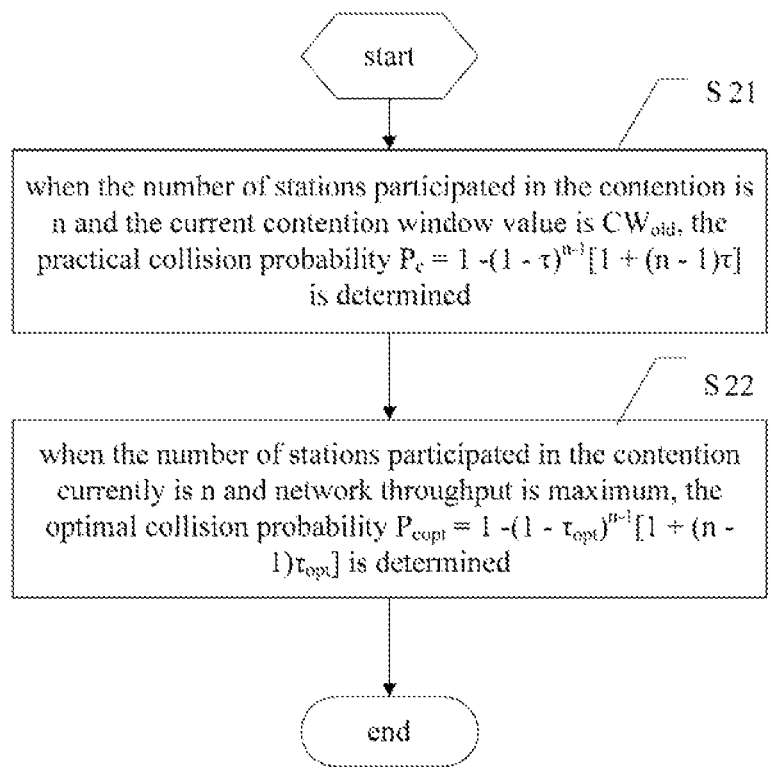
FIG. 3 is a flowchart showing acquiring practical collision probability and optimal collision probability in a method for adjusting a contention window value adaptively according to a first embodiment of the disclosure.

As shown in FIG. 3, FIG. 3 is a flowchart showing acquiring practical collision probability and optimal collision probability in a method for adjusting a contention window value adaptively according to a first embodiment of the disclosure. Step S20 specifically comprises:

step S21, when the number of stations participated in the contention is n and the current contention window value is $CW_{old}$, the practical collision probability $P_c=1-(1-\tau)^{n-1}[1+(n-1)\tau]$ is determined, where $\tau$ is a sending probability of a station at the beginning of a time slot of a channel when the current contention window value is $CW_{old}$; and step S22, when the number of stations participated in the contention currently is n and network throughput is maximum, the optimal collision probability $P_{copt}=1-(1-\tau_{opt})^{n-1}[1+(n-1)\tau_{opt}]$ is determined, where $\tau_{opt}$ is a sending probability of a station at the beginning of a time slot of a channel when the network throughput is maximum.

The $\tau$ in the present embodiment is related to the number n of stations participated in the contention currently and current contention window value $CW_{old}$, and $\tau_{opt}$ is related to the number n of stations participated in the contention currently and an optimal CW value, i.e. it being obtained according to maximum network throughput. The two parameters may be obtained through statistic calculation. According to the number n of stations participated in the contention in the current network, the practical collision probability $P_c$ of the current contention window value $CW_{old}$ and optimal collision probability $P_{copt}$ under the maximum network throughput are calculated so as to dynamically adjust the initial contention window value $CW_{init}$ and retransmission contention window value $CW_{new}$, which may better reflect network collision situation, and make the contention window value close to an optimal value so as to improve the network throughout, and reduce the delay.

Figure 4:
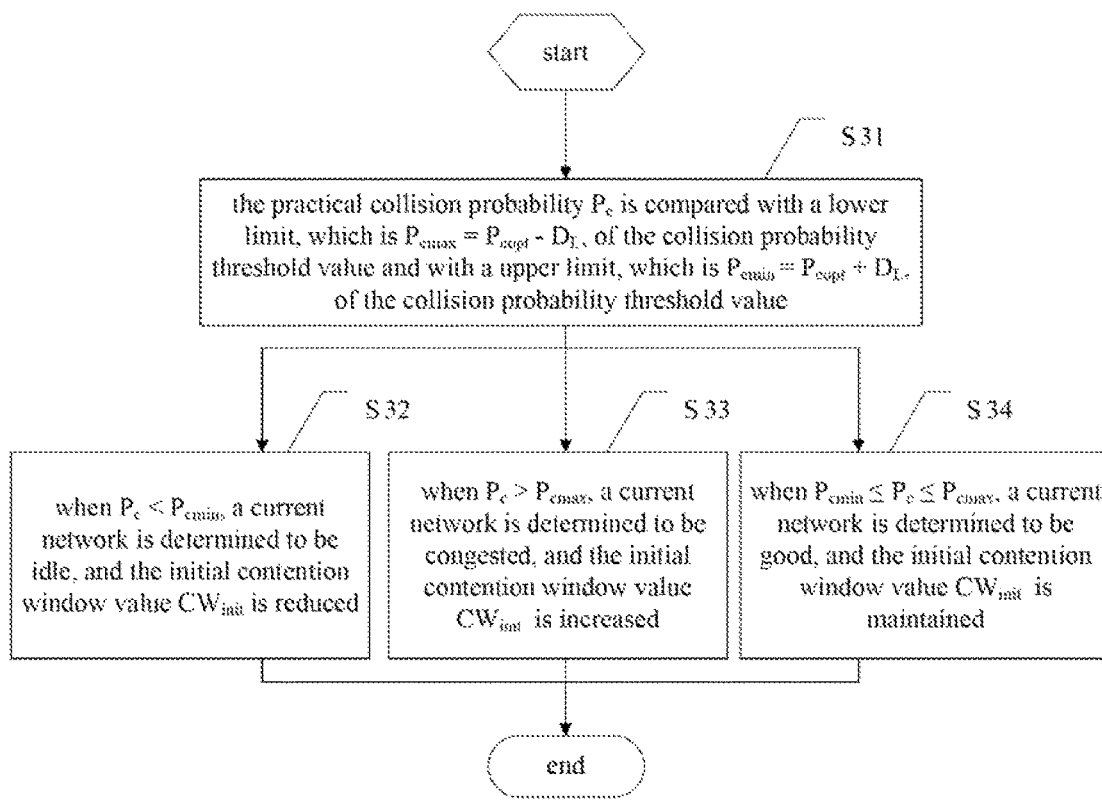
FIG. 4 is a flowchart showing adjusting an initial contention window value in a is method for adjusting a contention window value adaptively according to a first embodiment of the disclosure.

As shown in FIG. 4, FIG. 4 is a flowchart showing adjusting an initial contention window value in a method for adjusting a contention window value adaptively according to a first embodiment of the disclosure.

Step S30 specifically comprises:

step S31 the practical collision probability $P_c$ is compared with a lower limit, which is $P_{cmax}=P_{copt}-D_L$, the collision probability threshold value and with a upper limit, which is $P_{cmin}=P_{copt}+D_L$, of the collision probability threshold value, where $D_L$ is an interactive tolerance threshold;

wherein the interactive tolerance threshold $D_L$ may be obtained through simulation;

step S32, when $P_c<P_{cmin}$, a current network is determined to be idle, and the initial contention window value $CW_{init}=\min[CW_{old}-CW_{step1}, CW_{max}]$ is reduced, where $CW_{step1}$ is a step length of a first initial contention window value;

when $P_c<P_{cmin}$, it represents that the collision is lighter and the network is relative idle, and the contention window value should be reduced to improve time slot utilization ratio and reduce delay.

Step S33, when $P_c>P_{cmax}$, a current network is determined to be congested, and the initial contention window value $CW_{init}=\min[CW_{old}+CW_{step2}, CW_{max}]$ is increased, where $CW_{step2}$ is a step length of a second initial contention window value;

when $P_c>P_{cmax}$, it represents that collision is rather severe, and the network is rather congested, and the contention window value should be increased to reduce the collision.

Step S34, when $P_{cmin}\leq P_c\leq P_{cmax}$, a current network is determined to be good, and the initial contention window value $CW_{init}=\min[CW_{old}, CW_{max}]$ is maintained.

In the present embodiment, the practical collision probability $P_c$ is compared with the optimal collision probability $P_{copt}$, under the maximum network throughput, and the initial contention window value $CW_{init}$ is adjusted dynamically which may better reflect network collision situation, and make the contention window value close to an optimal value so as to improve the time slot utilization rate and reduce delay when the network is relatively idle, and reduce collisions when the network is relatively congested.

Figure 5:
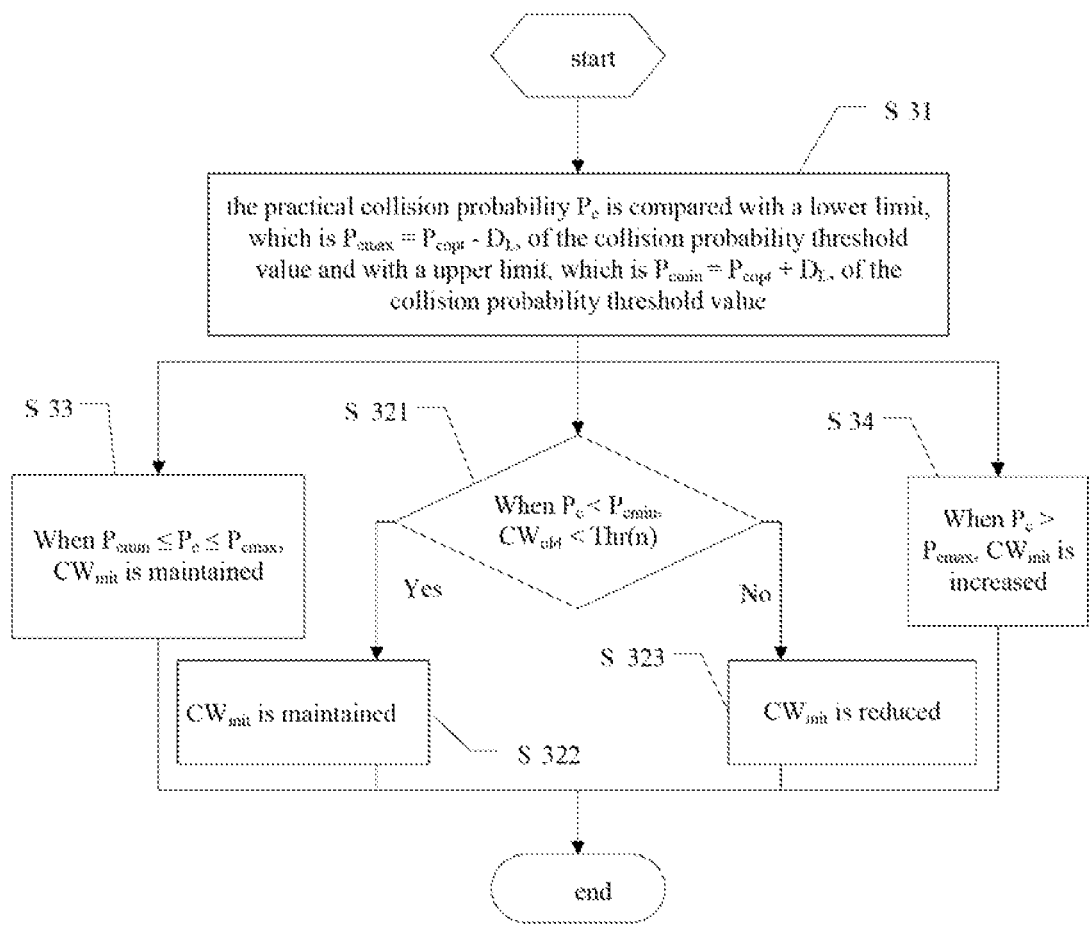
FIG. 5 is a flowchart showing adjusting an initial contention window value in a method for adjusting a contention window value adaptively according to a second embodiment of the disclosure.

As shown in FIG. 5, FIG. 5 is a flowchart showing adjusting an initial contention window value in a method for adjusting a contention window value adaptively according to a second embodiment of the disclosure.

Step S30 specifically comprises:

step S31, the practical collision probability $P_c$ is compared with a lower limit, which is $P_{cmax}=P_{copt}-D_L$, of the collision probability threshold value and with a upper limit, which is $P_{cmin}=P_{copt}+D_L$, of the collision probability threshold value, where $D_L$ an interactive tolerance threshold;

Step S321, when $P<P_{cmin}$, it is detected whether a current contention window value $CW_{old}$ is less than a contention window threshold value $Thr(n)$; if yes, turn to step S322; and if no, turn to step S323;

The contention window threshold value $Thr(n)$ is a function of the number n of stations participated in the contention currently, and may be an experience value obtained through relationship curve of the number of stations in the contention and collision probability according to the embodiment shown in FIG. 1.

Step S322, the current contention window value $CW_{old}$ is determined to be appropriate with respect to the current network, and the step length of the initial contention window value $CW_{step1}=0$, and the initial contention window value $CW_{init}=\min[CW_{old}, CW_{max}]$ is maintained;

step S323, the current contention window value $CW_{old}$ is determined to be too large with respect to the current network, and the step length of the initial contention window value $CW_{step1}<0$, and the initial contention window value $CW_{init}=\min[CW_{old}-CW_{step1}, CW_{max}]$ is reduced;

and since current contention window value $CW_{old}$ is too large with respect to the current network, and the step length $CW_{step}=2^{-1}\cdot CW_{old}$ of regulated first initial contention window value should be decreased substantially, and the initial contention window value $CW_{init}=\min[2^{-1}\cdot CW_{old}, CW_{max}]$ is decreased by half, so as to alleviate the decrease of throughput caused by the contention window value being too large as soon as possible.

Step S33, when $P_c>P_{cmax}$, a current network is determined to be congested, and the initial contention window value $CW_{init}=\min[CW_{old}-CW_{step2}, CW_{max}]$ is increased, where $CW_{step2}$ is a step length of a second initial contention window value;

at the moment, $CW_{step2}=f(CW_{old})\cdot L(n)$, where $f(CW_{old})$ is a decreasing function of $CW_{old}$, and $L(n)$ is an increasing function of n, and $CW_{step2}$ obtained through the two functions enables $CW_{init}$ to approximately satisfy a relationship curve of the number of contention stations and collision probability in the embodiment as shown in FIG. 1. It can be seen that when the number n of stations participated in contention is certain, $L(n)$ is constant, and with the increase of $CW_{old}$ value, $f(CW_{old})$ decreases and $CW_{step2}$ decreases. In the case of the $CW_{old}$ value being rather large, the collision probability decreases, and at the moment, CW needs to be regulated with a step length with a smaller value, i.e. slowly adjusting the CW, which is more beneficial to adjust the CW to an optimal value; however, in the case of the CW value being smaller, the collision probability is higher, and the CW needs to be regulated with a step length with as larger value, i.e. quickly regulating the CW, which is beneficial to adjust the CW to the optimal value more quickly.

Step S34, when $P_{cmin}\leq P_c\leq P_{cmax}$, a current network is determined to be good, and the initial contention window value $CW_{init}=\min[CW_{old}, CW_{max}]$ is maintained.

According to results of the practical collision probability $P_c$ respectively comparing with the optimal collision probability $P_{copt}$ and the contention window threshold value $Thr(n)$, the initial contention window value $CW_{init}$ is regulated in the present embodiment. When the network is relatively idle and the current contention window value $CW_{old}$ is too large with respect to the current network, the contention window value is decreased substantially so as to alleviate the decreasing of throughput caused by the contention window value being too large; when the network is congested, the contention window value is increased to reduce collision.

Figure 6:
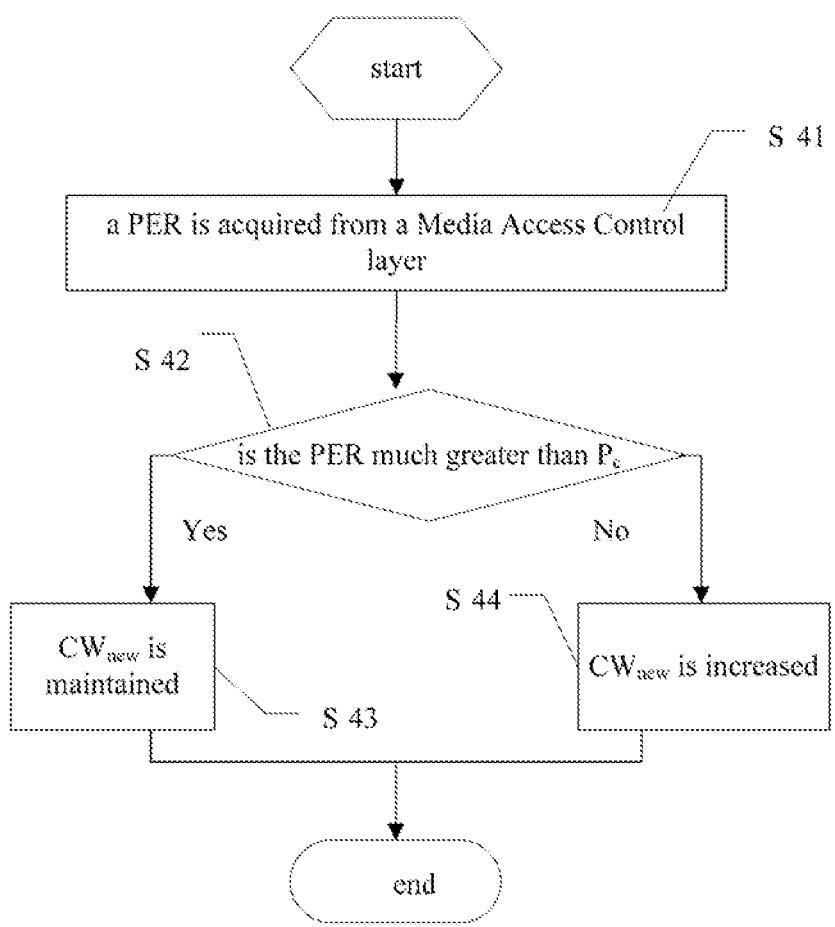
FIG. 6 is a flowchart showing adjusting, a retransmission contention window value in a method for adjusting a contention window value adaptively according to a first embodiment of the disclosure.

As shown in FIG. 6, FIG. 6 is a flowchart showing adjusting a retransmission contention window value in a method for adjusting a contention window value adaptively according to a first embodiment of the disclosure.

Step S40 specifically comprises:

step S41, a Packet Error Rate (PER) is acquired from a Media Access Control (MAC) layer;

wherein PER=the number of frames which are verified wrongly number of totally verified frames.

Step S42, it is detected the PER is much greater than the practical collision probability $P_c$, and if yes, turn to step S43; and if no, turn to step S44.

PER>a·$P_c$ may be used for determining that PER is much greater than $P_c$, where a is a multiple and may be determined according to the practical network condition, for example, when a=100, then when PER is greater than 100 multiples of $P_c$, the PER is determined to be much greater than $P_c$.

Step S43, a reason for data frame transmission failure is determined to be caused by bad network environment, and the retransmission contention window value $CW_{new}$=min $[CW_{old}, CW_{max}]$ is maintained; and step S44, the reason for data frame transmission failure is determined to be caused by collision, and the retransmission contention window value $CW_{new}$=min$[CW_{old}+CW_{step3}, CW_{max}]$ is increased, where $CW_{step3}$ is the step length of the retransmission contention window value;

at the moment, $CW_{step3}$=f($CW_{old}$)·L'(n), where f($CW_{old}$) is a decreasing function of $CW_{old}$, and L'(n) is a second increasing function of n, and $CW_{step3}$ obtained through the two functions enables $CW_{new}$ to approximately satisfy a relationship curve of the number of contention stations and collision probability in the embodiment as shown in FIG. 1. It can be seen that when the number n of stations participated in the contention is certain, L'(n) is constant, and with the increase of $CW_{old}$ value, f($CW_{old}$) decreases and $CW_{step3}$ decreases. In the case of the $CW_{old}$ value being rather large, the collision probability decreases, and at the moment, CW needs to be regulated with a step length with a smaller value, i.e. slowly adjusting the CW, which is more beneficial to adjust the CW to an optimal value; however, in the case of the CW value being smaller, the collision probability is higher, and the CW needs to be regulated with a step length with a larger value, i.e. quickly regulating the CW, which is beneficial to adjust the CW to the optimal value more quickly. In addition, L'(n) may the same as L(n) in the embodiment shown in FIG. 5.

By comparing the practical collision probability with the PER, in the present embodiment the network collision situation may be reflected better, the retransmission contention window value may dynamically be adjusted to make the contention window value finally approaching to optimal value, improve the network throughout, and reduce the delay.

Figure 7:
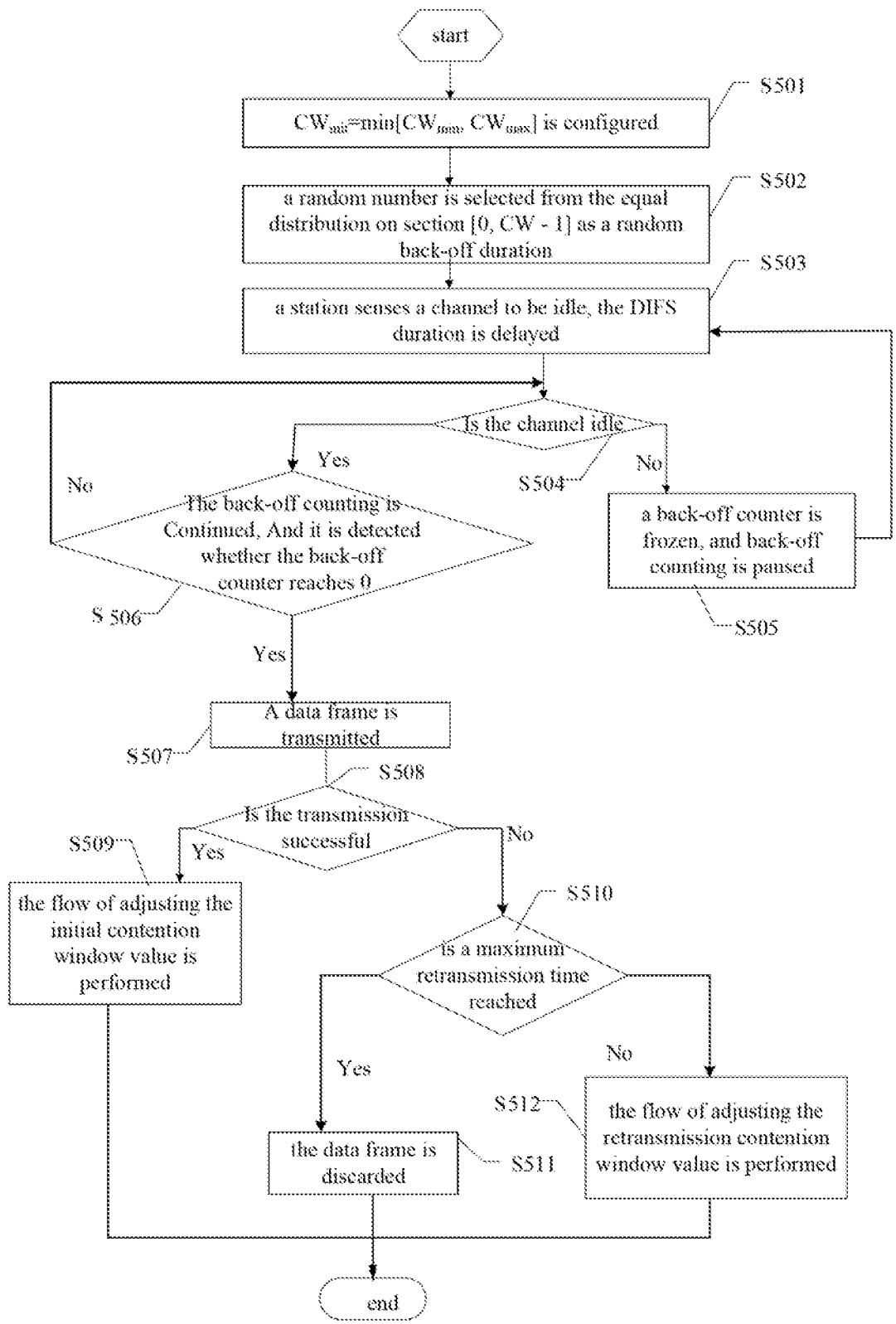
FIG. 7 is a flowchart of a method for adjusting a contention window value adaptively according to a second embodiment of the disclosure.

As shown in FIG. 7, FIG. 7 is method for adjusting a contention window value adaptively according to a second embodiment of the disclosure.

Step S501, $CW_{init}$=min$[CW_{min}, CW_{max}]$ configured; and in the protocol of 802.11n, $CW_{min}$ is specified to be 16.

Step S502, a random number is selected from the equal distribution on section [0, CW−1] as a random back-off duration;

Step S503, a station senses a channel to be idle, the DIPS duration is delayed;

Step S504, it is detected whether the channel is idle; if no, turn to step S505; and if yes, turn to step S506;

Step S505, a back-off counter is frozen, and back-off counting is paused, and step S503 is performed;

Step S506, the back-off counting, is continued, and it is detected whether the back-off counter reaches 0; if no, turn to step S504; and if yes, turn to step S507;

During a back-off period, if the channel maintains an idle state, then back-off counting is continued, and it is detected whether the back-off counter reaches 0, and if the channel is busy, then the back-off counting is paused until the channel is idle again, then the counting is continued.

Step S507, a data frame is transmitted.

Step S505, it is detected whether the data frame is transmitted successfully; if yes, turn to step S509; and if no, turn to step S510.

Step S509, the flow of adjusting the initial contention window value is performed;

and the flow of adjusting the initial contention window value may be referred to embodiments as shown in FIG. 1 to FIG. 5, which is not described in detail herein, Step S510, it is detected whether a maximum retransmission time is reached; if yes, turn to step S511; and if no, turn to step S512.

Step S511, the data frame is discarded.

Step S512, the flow of adjusting the retransmission contention window value is performed.

The flow of adjusting the retransmission contention window value may be referred to embodiments as shown in FIG. 1, FIG. 2 and FIG. 6, which is not described in detail herein.

Since the flow of adjusting the initial contention window value and the flow of adjusting the retransmission contention window value m the present embodiment use all the technical solutions of the above embodiments as shown in FIG. 1 to FIG. 6, the present embodiment may likewise better reflect network collision situation, dynamically adjust initial contention window value and retransmission contention window value jointly, which may make the contention window value finally approaching to optimal value, improve the network throughout, and reduce the delay.

Figure 8:
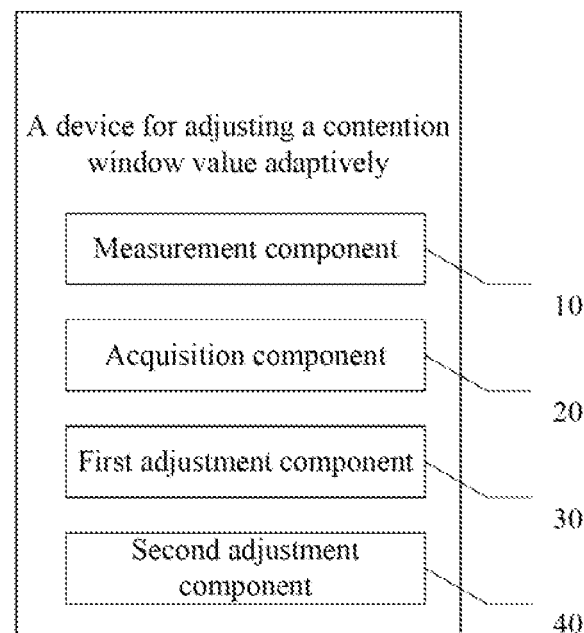
FIG. 8 is a structural schematic diagram of a device for adjusting a contention window value adaptively according to a first embodiment of the disclosure.

As shown in FIG. 8, FIG. 8 is a structural schematic diagram a device for adjusting a contention window value adaptively according to a first embodiment of the disclosure. The device for adjusting a contention window value adaptively in the present embodiment comprises:

a measurement component 10 configured to measure number n of stations participated in a contention currently;

an acquisition component 20 configured to acquire the practical collision probability $P_c$ of the current contention window value $CW_{old}$ and optimal collision probability $P_{copt}$ under the maximum network throughput according to the number n of stations participated in the contention currently;

a first adjustment component 30 configured to according to the practical collision probability $P_c$ and optimal collision probability $P_{copt}$ when a data frame is transmitted successfully, adjust a initial contention window value $CW_{init}$; and a second adjustment component 40 configured to adjust a retransmission contention window value $CW_{new}$ according to the practical collision probability $P_c$ to when the data frame is transmitted unsuccessfully.

In the present embodiment, the practical collision probability and optimal collision probability are calculated according to the number of stations participated in contention in the current network, and when the data frame is transmitted successfully, the practical collision probability is compared with the optimal is collision probability under the maximum network throughput so as to dynamically adjust the initial contention window value; and when the data frame is transmitted unsuccessfully, the practical collision probability is compared with the packet error rate so as to dynamically adjust the retransmission contention window value. In the disclosure, the network collision situation may be reflected better, and the initial contention window value and retransmission contention window value may be adjusted dynamically. Through the above solution the contention window value may approach to an optimal value, the network throughout may be improved, and the delay maybe reduced.

Figure 9:
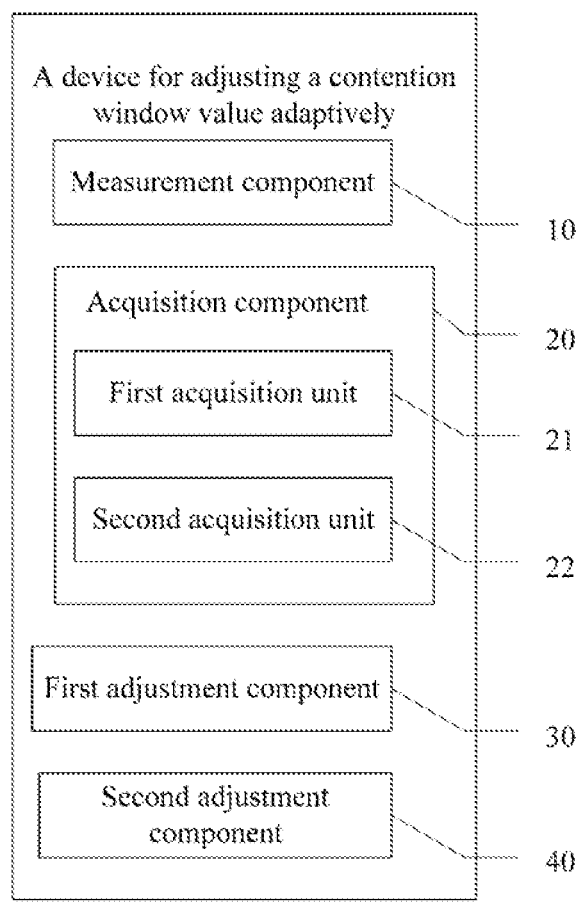
FIG. 9 is as structural schematic diagram of a device for adjusting a contention window value adaptively according to a second embodiment of the disclosure.

As shown in FIG. 9, FIG. 9 is a structural schematic diagram a device for adjusting a contention window value adaptively according to a second embodiment of the disclosure.

The acquisition component 20 specifically comprises:

a first acquisition unit 21 configured to, when the number of stations participated in the contention currently is ii and a current contention window value is $CW_{old}$, determine the practical collision probability $P_c=1-(1-\tau)^{n-1}[1+(n-1)\tau]$, where $\tau$ is a sending probability of a station at the beginning of a time slot of a channel when the current contention window value is $CW_{old}$; and a second acquisition unit 22 configured to, when the number of stations participated in the contention currently is n and network throughput is maximum, determine the optimal collision probability $P_{copt}=1-(1-\tau_{opt})^{n-1}[1+(n-1)\tau_{opt}]$, where $\tau_{opt}$ is a sending probability of a station at the beginning of a time slot of a channel when the network throughput is maximum.

The $\tau$ in the present embodiment is related to the number n of stations participated in the contention currently and current contention window value $CW_{old}$, and $\tau_{opt}$ is related to the number it of stations participated in the contention currently and an optimal CW value, i.e. it being obtained according to maximum network throughput. The two parameters may be obtained through statistic calculation. According to the number it of stations participated in contention in the current network, the practical collision probability $P_c$ of the current contention window value $CW_{old}$ and optimal collision probability $P_{copt}$ under the maximum network throughput are calculated so as to dynamically adjust the initial contention window value $CW_{init}$ and retransmission contention window value $CW_{new}$, which may better reflect network collision situation, and make the contention window value close to an optimal value so as to improve the network throughout, and reduce the delay.

Figure 10:
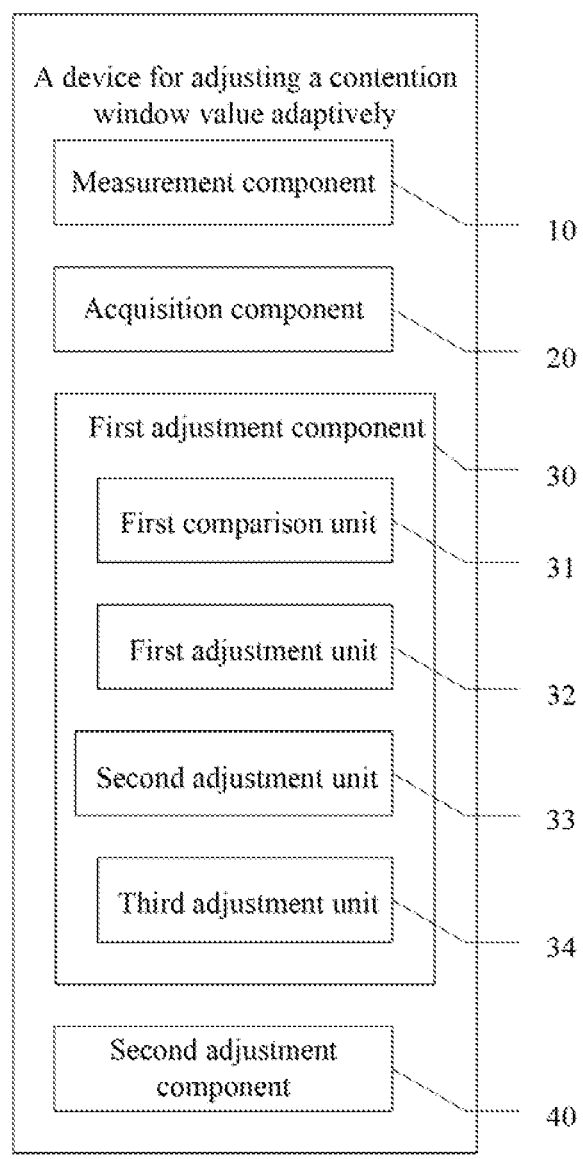
FIG. 10 is a structural schematic diagram of a device for adjusting a contention window value adaptively according to a third embodiment of the disclosure.

As shown in FIG. 10, FIG. 10 is a structural schematic diagram of a device for adjusting a contention window value adaptively according to a third embodiment of the disclosure.

The first adjustment component 30 specifically comprises:

a first comparison unit 31 configured to compare the practical collision probability $P_c$, with a lower limit, which is $P_{cmax}=P_{copt}-D_L$, of a collision probability threshold value and with a upper limit, which is $P_{cmin}=P_{copt}+D_L$, of the collision probability threshold value, where $D_L$ an interactive tolerance threshold, and the interactive tolerance threshold $D_L$ may be obtained through simulation;

a first adjustment unit 32 configured to, when $P_c<P_{cmin}$, determine a current network to be idle, and reduce the initial contention window value $CW_{init}=\min[CW_{old}-CW_{step1}, CW_{max}]$, where $CW_{step1}$ is a step length of a first initial contention window value;

a second adjustment unit 33 configured to, when $P_c>P_{cmax}$, determine the current network to be congested, and increase the initial contention window value $CW_{init}=\min[CW_{old}+CW_{step2}, CW_{max}]$, wherein the $CW_{step2}$ is a step length of a second initial contention window value; at the moment $CW_{step2}=f(CW_{old})\cdot L(n)$, where $f(CW_{old})$ is a decreasing function of $CW_{old}$, and $L(n)$ is an increasing function of n, and the $CW_{step2}$ obtained, through the two functions enables $CW_{init}$ to approximately satisfy a relationship curve illustrating relationships between the number of contention stations and collision probability in the embodiment as shown in FIG. 1. It can be seen that when the number n of stations participated in contention is certain, $L(n)$ is constant, and with the increase of $CW_{old}$ value, $f(CW_{old})$ decreases and $CW_{step2}$ decreases. In the case of the $CW_{old}$ value being rather large, the collision probability decreases, and at the moment, CW needs to be regulated with a step length with a smaller value, i.e. slowly adjusting the CW, which is more beneficial to adjust the CW to an optimal value; however, in the case is of the CW value being smaller, the collision probability is higher, and the CW needs to be regulated with a step length with a larger value, i.e. quickly regulating the CW, which is beneficial to adjust the CW to the optimal value more quickly.

a third adjustment unit 34 configured to, when $P_{cmin}\leq P_c\leq P_{cmax}$, determine a current network to be good, and maintain the initial contention window value $CW_{init}=\min[CW_{old}, CW_{max}]$.

In the present embodiment, when $P_c<P_{cmin}$, it represents that the collision is lighter and the network is relative idle, and the contention window value should be reduced to improve time slot utilization ratio and reduce delay; when $P_c>P_{cmax}$, it represents that collision is rather severe, and the network is rather congested, and the contention window value should be increased to reduce the collision. In the present embodiment, the practical collision probability $P_c$ is compared with the optimal collision probability $P_{copt}$ under the maximum network throughput, and the initial contention window value $CW_{init}$ is adjusted dynamically. The above solution can better reflect network collision situation, and make the contention window value close to an optimal value so as to improve the time slot utilization rate and reduce delay when the network is relatively idle, and reduce collisions when the network is relatively congested.

The first adjustment unit 32 in the embodiment of the disclosure is specifically configured to:

when $P_c<P_{cmin}$, detect whether the current contention window value $CW_{old}$ is less than a contention window threshold value $Thr(n)$, where the contention window threshold value $Thr(n)$ is a function of the number n of stations participated in the contention currently, and may be an experience value obtained through relationship curve illustrating relationships between the number of stations in contention and collision probability according to the embodiment shown in FIG. 1;

if yes, determine the current contention window value $CW_{old}$ to be appropriate with respect to the current network, and set a step length of the initial contention window value $CW_{step1}=0$, and maintain the initial contention window value $CW_{init}=\min[CW_{old}, CW_{max}]$;

and if no, determine the current contention window value $CW_{old}$ to be too large with respect to the current network, set a step length of the initial contention window value $CW_{step1}>0$, and reduce the initial contention window value $CW_{init}=\min[CW_{old}-CW_{step1}, CW_{max}]$.

In the present embodiment, when the $CW_{old}$ is greater than the contention window threshold value $Thr(n)$, and since current contention window value $CW_{old}$ is too large with respect to the current network, and the step length $CW_{step}=2^{-1}\cdot CW_{old}$ of regulated first initial contention window value should be decreased substantially, and the initial contention window value $CW_{init}=\min[2^{-1}\cdot CW_{old}, CW_{max}]$ is decreased by half, so as to alleviate the decrease of throughput caused by the contention window value being too large as soon as possible. According to results of the practical collision probability $P_c$ respectively comparing with the optimal collision probability $P_{copt}$ and the contention window threshold value $Thr(n)$, the present embodiment regulates the initial contention window value $CW_{init}$; when the network is relatively idle and the current contention window value $CW_{old}$ is too large with respect to the current network, the contention window value is decreased substantially so as to alleviate the decreasing of throughput caused by the contention window value being too large;

when the network is congested, the contention window value is increased to reduce collision.

Figure 11:
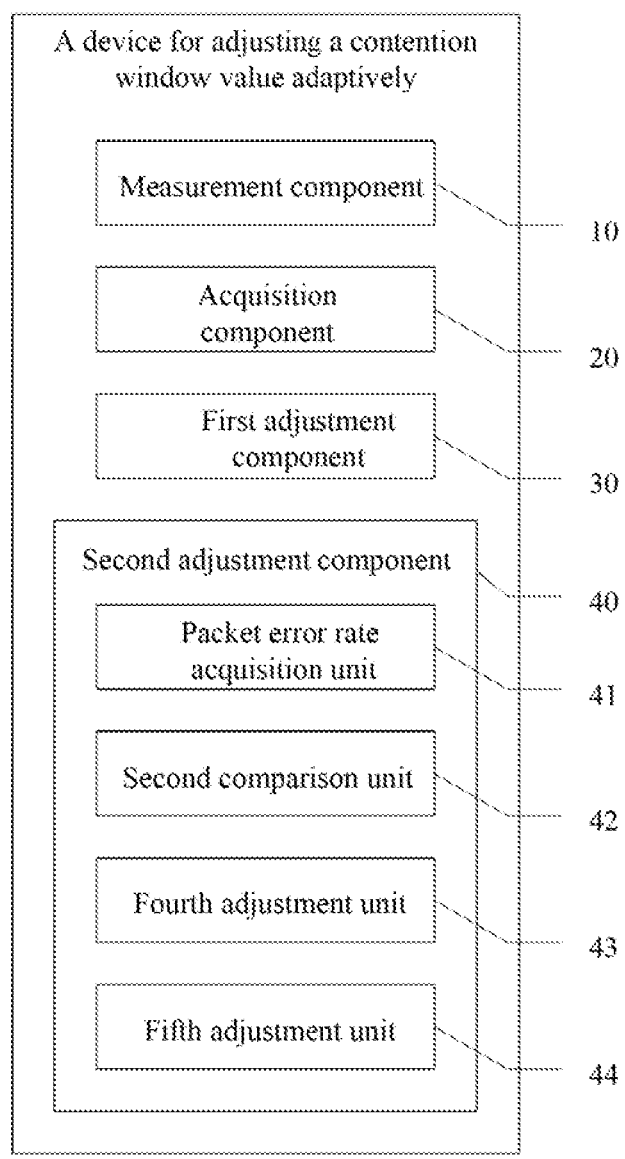
FIG. 11 is a structural schematic diagram of a device for adjusting a contention window value adaptively according to a fourth embodiment of the disclosure.

As shown in FIG. 11, FIG. 11 is a structural schematic diagram of a device for adjusting a contention window value adaptively according to a fourth embodiment of the disclosure.

The second adjustment component 40 specifically comprises:

a packet error rate acquisition unit 41 configured to acquire a PER from a MAC layer, wherein PER=the number of frames which are verified wrongly÷the number of totally verified frames;

a second comparison unit 42 configured to detect whether the PER is much greater than the practical collision probability $P_c$;

a fourth adjustment unit 43 configured to, when the PER is greater than $P_c$, determine that the reason for data frame transmission failure is caused by bad network environment, and maintain the retransmission contention window value $CW_{new}=\min[CW_{old}, CW_{max}]$; and a fifth adjustment unit 44 configured to, when the PER is not much greater than $P_c$, determine that the reason for data frame transmission failure is caused by collision, and increase the retransmission contention window value $CW_{new}=\min[CW_{old}+CW_{step3}, CW_{max}]$, where $CW_{step3}$ is a step length of the retransmission contention window value. At the moment, $CW_{step3}=f(CW_{old})-L'(n)$, where $f(CW_{old})$ is a decreasing function of $CW_{old}$, and $L'(n)$ is a second increasing function of n, and $CW_{step3}$ obtained according to the two functions enables $CW_{new}$ to approximately satisfy a relationship curve showing relationships between the number of contention stations and collision probability in the embodiment as shown in FIG. 1. It can be seen that when the number n of stations participated in contention is certain, $L'(n)$ is constant, and with the increase of $L'(n)$, $f(CW_{old})$ decreases and $CW_{step3}$ decreases. In the case of the $CW_{old}$ value being rather large, the collision probability decreases, and at the moment, CW needs to be regulated with a step length with a smaller value, i.e. slowly adjusting the CW, which is more beneficial to adjust the CW to an optimal value; however, in the case of the CW value being smaller, the collision probability is higher, and the CW needs to be regulated with a step length with a larger value, i.e. quickly regulating the CW, which is beneficial to adjust the CW to the optimal value more quickly. In addition, $L'(n)$ may be the same as $L(n)$ in the embodiment shown in FIG. 5.

In the present embodiment, $PER>a \cdot P_c$, may be used for further determining that PER is much greater than $P_c$, where a is a multiple and may be determined according to the practical network condition, for example, when a=100, then when PER is greater than 100 multiples of $P_c$, the PER is determined to be much greater than $P_c$. By comparing the practical collision probability with the packet error rate, the present embodiment may better reflect network collision situation, dynamically adjust retransmission contention window value to make the contention window to value finally approaching to optimal value, improve the network throughout, and reduce the delay.

Any equivalent replacements of the structure or the flow based on the contents of the specification and drawings of the disclosure, or direct or indirect application of the equivalent replacements in other related technical fields shall fall within the scope of protection of the disclosure.

INDUSTRIAL APPLICABILITY

The above-mentioned technical solutions provided in the disclosure may be applied to contention window value adaptive adjustment, and based on the technical solutions provided in the disclosure the network collision situation may be reflected better, the initial contention window value and retransmission contention window value are dynamically adjusted, thus making the contention window value finally approaching to optimal value, improving the network throughout, and reducing the delay.

What is claimed is:

1. A method for adjusting contention window value adaptively, comprising:

measuring a number n of stations participated in a contention currently;

acquiring a practical collision probability $P_c$ of a current contention window value $CW_{old}$ and optimal collision probability $P_{copt}$ under maximum network throughput according to the number n of stations participated in the contention currently;

when a data frame is transmitted successfully, adjusting an initial contention window value $CW_{init}$ according to the practical collision probability $P_c$ and optimal collision probability $P_{copt}$; and when the data frame is transmitted unsuccessfully, adjusting a retransmission contention window value $CW_{new}$ according to the practical collision probability $P_c$.

2. The method for adjusting contention window value adaptively according to claim 1, wherein acquiring the practical collision probability $P_c$ of the current contention window value $CW_{old}$ and optimal collision probability $P_{copt}$ under the maximum network throughput according to the number n of stations participated in the contention currently comprises:

when the number of stations participated in the contention currently is n and the current contention window value is $CW_{old}$, determining the practical collision probability $P_c=1-(1-\tau)^{n-1}[1+(n-1)\tau]$, where $\tau$ is a sending probability of a station at a beginning of a time slot of a channel when the current contention window value is $CW_{old}$; and when the number of stations participated in the contention currently is n and network throughput is maximum, determining the optimal collision probability $P_{copt}=1-(1-\tau_{opt})^{n-1}[1+(n-1)\tau_{opt}]$, where $\tau_{opt}$ is a sending probability of a station at a beginning of a time slot of a channel when the network throughput is maximum.

3. The method for adjusting contention window value adaptively according to claim 1, wherein adjusting the initial contention window value $CW_{init}$ according to the practical collision probability $P_c$ and the optimal collision probability $P_{copt}$ comprises:

comparing the practical collision probability $P_c$ with a lower limit, which is $P_{cmax}=P_{copt}-D_L$, of a collision probability threshold value and an upper limit, which is $P_{cmin}=P_{copt}+D_L$, of the collision probability threshold value, where $D_L$ is an interactive tolerance threshold value;

when $P_c<P_{cmin}$, determining a current network to be idle, and reducing the initial contention window value $CW_{init}=\min[CW_{old}-CW_{step1}, CW_{max}]$, where $CW_{step1}$ is a step length of a first initial contention window value, and wherein $CW_{max}$ is a maximum contention window value;

when $P_c>P_{cmax}$, determining a current network to be congested, and increasing the initial contention window value $CW_{init}=\min[CW_{old}+CW_{step2}, CW_{max}]$, where $CW_{step2}$ is a step length of a second initial contention window value;

when $P_{cmin} \leq P_c \leq P_{cmax}$, determining a current network to be good, and maintaining the initial contention window value $CW_{init}=\min[CW_{old}, CW_{max}]$.

4. The method for adjusting contention window value adaptively according to claim 3, wherein determining the current network to be idle and reducing the initial contention window value $CW_{init}$ when $P_c<P_{cmin}$ comprises:
when $P_c<P_{cmin}$, detecting whether the current contention window value $CW_{old}$ is less than a contention window threshold value $Thr(n)$;
based on the $CW_{old}$ is less than the $Thr(n)$, determining the current contention window value $CW_{old}$ is appropriate with respect to the current network, and the step length of the first initial contention window value $CW_{step1}=0$, and maintaining the initial contention window value $CW_{init}=\min[CW_{old}, CW_{max}]$;
based on the $CW_{old}$ is not less than the $Thr(n)$, determining the current contention window value $CW_{old}$ is too large with respect to the current network, and the step length of the first initial contention window value $CW_{step1}>0$, and reducing the initial contention window value $CW_{init}=\min[CW_{old}-CW_{step1}, CW_{max}]$.

5. The method for adjusting contention window value adaptively according to claim 1, wherein adjusting the retransmission contention window value $CW_{new}$ according to the practical collision probability $P_c$ comprises:
acquiring a Packet Error Rate (PER) from a media access control layer;
detecting whether the PER is much greater than the practical collision probability $P_c$;
when the PER is much greater than the $P_c$, determining that a reason for data frame transmission failure is caused by bad network environment, and maintaining the retransmission contention window value $CW_{new}=\min[CW_{old}, CW_{max}]$, and wherein $CW_{max}$ is a maximum contention window value; and
when the PER is not much greater than the $P_c$, determining that a reason for data frame transmission failure is caused by collision, and increasing the retransmission contention window value $CW_{new}=\min[CW_{old}+CW_{step3}, CW_{max}]$, where $CW_{step3}$ is a step length of the retransmission contention window value.

6. A device for adjusting contention window value adaptively, comprising:
a memory; and
a hardware processor, configured to execute programming components stored in the memory, wherein the programming components comprise:
a measurement component configured to measure a number n of stations participated in a contention currently;
an acquisition component configured to acquire a practical collision probability $P_c$ of a current contention window value $CW_{old}$ and optimal collision probability $P_{copt}$ under maximum network throughput according to the number n of stations participated in the contention currently;
a first adjustment component configured to adjust an initial contention window value $CW_{init}$ according to the practical collision probability $P_c$ and optimal collision probability $P_{copt}$ when a data frame is transmitted successfully; and
a second adjustment component configured to adjust a retransmission contention window value $CW_{new}$ according to the practical collision probability $P_c$ when a data frame is transmitted unsuccessfully.

7. The device for adjusting contention window value adaptively according to claim 6, wherein the acquisition component comprises:
a first acquisition unit configured to determine the practical collision probability $P_c=1-(1-\tau)^{n-1}[1+(n-1)\tau]$ when the number of stations participated in the contention currently is n and the current contention window value is $CW_{old}$, where $\tau$ is a sending probability of a station at a beginning of a time slot of a channel and the current contention window value is $CW_{old}$; and
a second acquisition unit configured to determine the optimal collision probability $P_{copt}=1-(1-\tau_{opt})^{n-1}[1+(n-1)\tau_{opt}]$ when the number of stations participated in the contention currently is n and network throughput is maximum, where $\tau_{opt}$ is a sending probability of a station at a beginning of a time slot of a channel when the network throughput is maximum.

8. The device for adjusting contention window value adaptively according to claim 6, wherein the first adjustment component comprises:
a first comparison unit configured to compare the practical collision probability $P_c$ with a lower limit, which is $P_{cmax}=P_{copt}-D_L$, of a collision probability threshold value and with an upper limit, which is $P_{cmin}=P_{copt}+D_L$, of a collision probability threshold value, where $D_L$ is an interactive tolerance threshold value;
a first adjustment unit configured to, when $P_c<P_{cmin}$, determine a current network to be idle, and reduce the initial contention window value $CW_{init}=\min[CW_{old}-CW_{step1}, CW_{max}]$, where $CW_{step1}$ is a step length of a first initial contention window value, and wherein $CW_{max}$ is a maximum contention window value;
a second adjustment unit configured to, when $P_c>P_{cmax}$, determine the current network to be congested, and increase the initial contention window value $CW_{init}=\min[CW_{old}+CW_{step2}, CW_{max}]$, where $CW_{step2}$ is a step length of a second initial contention window value; and
a third adjustment unit configured to, when $P_{cmin} \leq P_c \leq P_{cmax}$, determine a current network to be good, and maintain the initial contention window value $CW_{init}=\min[CW_{old}, CW_{max}]$.

9. The device for adjusting contention window value adaptively according to claim 8, wherein the first adjustment unit is configured to:
when $P_c<P_{cmin}$, detect whether the current contention window value $CW_{old}$ is less than a contention window threshold value $Thr(n)$;
when the $CW_{old}$ is less than the $Thr(n)$, determine that the current contention window value $CW_{old}$ is appropriate with respect to the current network, and the step length of the first initial contention window value $CW_{step1}=0$, and maintain the initial contention window value $CW_{init}=\min[CW_{old}, CW_{max}]$, and wherein $CW_{max}$ is a maximum contention window value;
when the $CW_{old}$ is not less than the $Thr(n)$, determine that the current contention window value $CW_{old}$ is too large with respect to the current network, and the step length of the first initial contention window value $CW_{step1}>0$, and reduce the initial contention window value $CW_{init}=\min[CW_{old}-CW_{step1}, CW_{max}]$.

10. The device for adjusting contention window value adaptively according to claim 6, wherein the second adjustment component comprises:
a packet error rate acquisition unit configured to acquire a Packet Error Rate (PER) from a media access control layer;

a second comparison unit configured to detect whether the PER is much greater than the practical collision probability $P_c$;

a fourth adjustment unit configured to, when the PER is much greater than $P_c$, determine that a reason for data frame transmission failure is caused by bad network environment, and maintain the retransmission contention window value $CW_{new}=\min[CW_{old}, CW_{max}]$ and wherein $CW_{max}$ is a maximum contention window value; and a fifth adjustment unit configured to, when the PER is not much greater than $P_c$, determine that a reason for data frame transmission failure is caused by collision, and increase the retransmission contention window value $CW_{new}=\min[CW_{old}+CW_{step3}, CW_{max}]$, where $CW_{step3}$ is a step length of the retransmission contention window value.

11. The method for adjusting contention window value adaptively according to claim 2, wherein adjusting the initial contention window value $CW_{init}$ according to the practical collision probability $P_c$ and the optimal collision probability $P_{copt}$ comprises:

comparing the practical collision probability $P_c$ with a lower limit, which is $P_{cmax}=P_{copt}-D_L$, of a collision probability threshold value and an upper limit, which is $P_{cmin}=P_{copt}+D_L$, of the collision probability threshold value, where $D_L$ is an interactive tolerance threshold value;

when $P_c<P_{cmin}$, determining a current network to be idle, and reducing the initial Penin, contention window value $CW_{init}=\min[CW_{old}-CW_{step1}, CW_{max}]$, where $CW_{step1}$ is a step length of a first initial contention window value, and wherein $CW_{max}$ is a maximum contention window value;

when $P_c>P_{cmax}$, determining a current network to be congested, and increasing the initial contention window value $CW_{init}=\min[CW_{old}+CW_{step2}, CW_{max}]$, where $CW_{step2}$ is a step length of a second initial contention window value;

when $P_{cmin}\leq P_c\leq P_{cmax}$, determining a current network to be good, and maintaining the initial contention window value $CW_{init}=\min[CW_{old}, CW_{max}]$.

12. The method for adjusting contention window value adaptively according to claim 2, wherein adjusting the retransmission contention window value $CW_{new}$ according to the practical collision probability $P_c$ comprises:

acquiring a Packet Error Rate (PER) from a media access control layer;

detecting whether the PER is much greater than the practical collision probability $P_c$;

when the PER is much greater than the $P_c$, determining that a reason for data frame transmission failure is caused by bad network environment, and maintaining the retransmission contention window value $CW_{new}=\min[CW_{old}, CW_{max}]$, and wherein $CW_{max}$ is a maximum contention window value; and when the PER is not much greater than the $P_c$, determining that a reason for data frame transmission failure is caused by collision, and increasing the retransmission contention window value $CW_{new}=\min[CW_{old}+CW_{step3}, CW_{max}]$, where $CW_{step3}$ is a step length of the retransmission contention window value.

13. The device for adjusting contention window value adaptively according to claim 7, wherein the first adjustment component comprises:

a first comparison unit configured to compare the practical collision probability $P_c$ with a lower limit, which is $P_{cmax}=P_{copt}-D_L$, of a collision probability threshold value and with an upper limit, which is $P_{cmin}=P_{copt}+D_L$, of a collision probability threshold value, where $D_L$ is an interactive tolerance threshold value;

a first adjustment unit configured to, when $P_c<P_{cmin}$, determine a current network to be idle, and reduce the initial contention window value $CW_{init}=\min[CW_{old}-CW_{step1}, CW_{max}]$, where $CW_{step1}$ is a step length of a first initial contention window value, and wherein $CW_{max}$ is a maximum contention window value;

a second adjustment unit configured to, when $P_c>P_{cmax}$, determine the current network to be congested, and increase the initial contention window value $CW_{init}=\min[CW_{old}+CW_{step2}, CW_{max}]$, where $CW_{step2}$ is a step length of a second initial contention window value; and a third adjustment unit configured to, when $P_{cmin}\leq P_c\leq P_{cmax}$, determine a current network to be good, and maintain the initial contention window value $CW_{init}=\min[CW_{old}, CW_{max}]$.

14. The device for adjusting contention window value adaptively according to claim 7, wherein the second adjustment component comprises:

a packet error rate acquisition unit configured to acquire a Packet Error Rate (PER) from a media access control layer;

a second comparison unit configured to detect whether the PER is much greater than the practical collision probability $P_c$;

a fourth adjustment unit configured to, when the PER is much greater than $P_c$, determine that a reason for data frame transmission failure is caused by bad network environment, and maintain the retransmission contention window value $CW_{new}=\min[CW_{old}, CW_{max}]$; and a fifth adjustment unit configured to, when the PER is not much greater than $P_c$, determine that a reason for data frame transmission failure is caused by collision, and increase the retransmission contention window value $CW_{new}=\min[CW_{old}+CW_{step3}, CW_{max}]$, where $CW_{step3}$ is a step length of the retransmission contention window value.

* * * * *